United States Patent
Liu et al.

(10) Patent No.: US 10,970,519 B2
(45) Date of Patent: Apr. 6, 2021

(54) VALIDATING OBJECTS IN VOLUMETRIC VIDEO PRESENTATIONS

(71) Applicant: AT&T Intellectual Property I, L.P., Atlanta, GA (US)

(72) Inventors: Zhu Liu, Marlboro, NJ (US); Eric Zavesky, Austin, TX (US); David Crawford Gibbon, Lincroft, NJ (US); Lee Begeja, Gillette, NJ (US); Paul Triantafyllou, Summit, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 72 days.

(21) Appl. No.: 16/385,368

(22) Filed: Apr. 16, 2019

(65) Prior Publication Data
US 2020/0334447 A1    Oct. 22, 2020

(51) Int. Cl.
*G06K 9/00* (2006.01)
*G06F 16/783* (2019.01)
(Continued)

(52) U.S. Cl.
CPC ....... *G06K 9/00201* (2013.01); *G06F 16/787* (2019.01); *G06F 16/7834* (2019.01);
(Continued)

(58) Field of Classification Search
CPC ........... G06K 9/00201; G06K 9/00671; G06K 2209/21; G06K 9/00637; G06K 9/46;
(Continued)

(56) References Cited

U.S. PATENT DOCUMENTS

| 5,850,352 A | 12/1998 | Moezzi et al. |
| 7,448,063 B2 | 11/2008 | Freeman et al. |

(Continued)

FOREIGN PATENT DOCUMENTS

| JP | 2016099941 A | 5/2016 |
| WO | 2007124664 A1 | 11/2007 |

(Continued)

OTHER PUBLICATIONS

Stancil, Brian A., Cha Zhang, and Tsuhan Chen. "Active multicamera networks: From rendering to surveillance." IEEE Journal of selected topics in signal processing 2.4 (2008): 597-605. http://chenlab.ece.cornell.edu/Publication/Brian/stancil_DPVN2008.pdf.

(Continued)

*Primary Examiner* — Nimesh Patel

(57) ABSTRACT

A method for validating objects appearing in volumetric video presentations includes obtaining a volumetric video presentation depicting a scene, wherein the volumetric video presentation is associated with a metadata file containing identifying information for the scene, identifying user-generated content that depicts the scene, by matching metadata associated with the user-generated content to the metadata file associated with the volumetric video presentation, comparing a first object appearing in the volumetric video presentation to a corresponding second object appearing in the user-generated content, assigning a score to the first object based on the comparing, wherein the score indicates a probability that the first object has not been manipulated, and altering the volumetric video presentation to filter the first object from the volumetric video presentation when the score falls below a threshold.

20 Claims, 3 Drawing Sheets

(51) Int. Cl.
*G06F 16/787* (2019.01)
*G06T 19/20* (2011.01)
*H04N 21/43* (2011.01)
*G06T 7/246* (2017.01)

(52) U.S. Cl.
CPC ..... *G06F 16/7837* (2019.01); *G06K 9/00671* (2013.01); *G06T 7/246* (2017.01); *G06T 19/20* (2013.01); *H04N 21/4307* (2013.01); *G06T 2207/30241* (2013.01)

(58) Field of Classification Search
CPC .. G06K 9/4642; G06K 9/6215; G06K 9/6267; G06K 2209/01; G06K 9/00302; G06K 9/00362; G06K 9/00664; G06K 9/00013; G06K 9/3241; G06F 16/7837; G06F 16/787; G06F 16/7834; G06F 3/0482; G06F 9/542; G06F 3/04842; G06F 16/248; G06F 3/0484; G06F 16/903; G06F 3/0481; G06F 16/26; G06F 16/9535; G06F 11/321; G06F 16/24565; G06F 16/9038; G06F 16/24573; G06F 16/168; G06F 16/2228; G06F 16/2322; G06F 16/285; G06F 11/30; G06F 11/3048; G06F 11/3072; G06F 11/323; G06F 16/24528; G06F 16/24578; G06F 2201/81; G06F 11/008; G06F 11/3003; G06F 3/04883; G06F 3/0488; G06F 3/017; G06F 3/04845; G06F 40/106; G06F 16/51; G06F 3/005; G06F 30/13; G06F 3/04815; G06F 21/6254; G06F 16/00; G06F 16/31; G06T 19/20; G06T 7/246; G06T 2207/3024; G06T 2200/24; G06T 15/04; G06T 15/20; G06T 15/40; G06T 15/60; G06T 19/003; G06T 2200/16; G06T 2200/28; G06T 7/0008; G06T 11/60; G06T 3/4038; G06T 13/40; G06T 17/05; G06T 2207/10016; G06T 2210/36; G06T 3/40; G06T 5/003; G06T 5/20; G06T 19/006; H04N 21/4307; H04L 41/22; H04L 41/5032; H04L 41/5009; H04L 43/045; H04L 43/04; H04L 43/16; H04L 43/08; H04L 41/0604; H04L 41/082; H04L 41/0853; H04L 63/0227; H04L 43/028; H04L 67/22; G06Q 10/06393; G06Q 10/0637; G06Q 10/0639; G06Q 10/00; G06Q 10/109; G06Q 30/0643; G06Q 10/10; G06Q 30/0256; G06Q 30/0625; G06Q 50/01; G06Q 20/3224; G06Q 20/3276; G06Q 20/32; G06Q 20/384; G06Q 30/0252; G06Q 30/0261; G06Q 30/0269; H04W 28/0215; H04W 4/029; H04W 4/38; H04W 4/021; H04W 4/06; H04W 4/60

See application file for complete search history.

(56) References Cited

U.S. PATENT DOCUMENTS

| | | | |
|---|---|---|---|
| 7,593,602 B2 | 9/2009 | Stentiford | |
| 7,778,445 B2 | 8/2010 | Au et al. | |
| 7,830,381 B2 | 11/2010 | Lundström et al. | |
| 7,944,454 B2 | 5/2011 | Zhou et al. | |
| 8,009,864 B2 | 8/2011 | Linaker et al. | |
| 8,477,154 B2 | 7/2013 | Davis et al. | |
| 8,477,998 B1 | 7/2013 | Kim et al. | |
| 8,488,877 B1 | 7/2013 | Owechko et al. | |
| 8,705,876 B2 | 4/2014 | Vaddadi et al. | |
| 8,755,610 B2 | 6/2014 | Holland et al. | |
| 8,964,008 B2 | 2/2015 | Bathiche | |
| 9,064,309 B2 | 6/2015 | Chaudhury et al. | |
| 9,153,073 B2 | 10/2015 | Langlotz et al. | |
| 9,185,361 B2 | 11/2015 | Curry | |
| 9,196,021 B2 | 11/2015 | Jin et al. | |
| 9,214,030 B2 | 12/2015 | Sole et al. | |
| 9,258,531 B2 | 2/2016 | Jia et al. | |
| 9,361,727 B2 | 6/2016 | Fuchs et al. | |
| 9,363,569 B1 | 6/2016 | Van Hoff et al. | |
| 9,406,131 B2 | 8/2016 | Würmlin et al. | |
| 9,449,230 B2 | 9/2016 | Han et al. | |
| 9,495,764 B1 | 11/2016 | Boardman et al. | |
| 9,591,336 B2 | 3/2017 | Cronin et al. | |
| 9,794,495 B1 | 10/2017 | Forsblom | |
| 9,836,885 B1 | 12/2017 | Eraker et al. | |
| 9,918,110 B2 | 3/2018 | Anwar et al. | |
| 9,922,404 B2 | 3/2018 | Lee et al. | |
| 9,940,898 B2 | 4/2018 | Cook et al. | |
| 9,947,108 B1 | 4/2018 | Chen | |
| 9,973,711 B2 | 5/2018 | Yang et al. | |
| 9,986,221 B2 | 5/2018 | Zhou | |
| 10,127,643 B2 | 11/2018 | Lee et al. | |
| 2003/0023974 A1 | 1/2003 | Dagtas et al. | |
| 2003/0095186 A1* | 5/2003 | Aman | H04N 5/232 348/162 |
| 2008/0246759 A1 | 10/2008 | Summers | |
| 2008/0284587 A1* | 11/2008 | Saigh | H04M 1/72541 340/539.13 |
| 2009/0021513 A1* | 1/2009 | Joshi | G06T 15/005 345/419 |
| 2011/0173565 A1* | 7/2011 | Ofek | G09B 29/00 715/790 |
| 2011/0249090 A1* | 10/2011 | Moore | G06T 19/006 348/43 |
| 2013/0016879 A1* | 1/2013 | Baele | G06K 9/6223 382/103 |
| 2015/0104065 A1 | 4/2015 | Park et al. | |
| 2015/0195406 A1* | 7/2015 | Dwyer | G06F 21/6254 379/265.07 |
| 2015/0226828 A1 | 8/2015 | Davies et al. | |
| 2016/0162588 A1* | 6/2016 | Tuchman | G06F 16/3344 707/722 |
| 2016/0198140 A1 | 7/2016 | Nadler | |
| 2016/0335748 A1 | 11/2016 | Newson et al. | |
| 2017/0061686 A1 | 3/2017 | Yu | |
| 2017/0180680 A1 | 6/2017 | Yu | |
| 2017/0195561 A1 | 7/2017 | Hegelich et al. | |
| 2017/0244948 A1 | 8/2017 | Pang et al. | |
| 2017/0244985 A1 | 8/2017 | Masterson | |
| 2017/0278256 A1* | 9/2017 | Esparra | G06T 7/292 |
| 2017/0316606 A1* | 11/2017 | Khalid | G06F 3/011 |
| 2017/0318275 A1 | 11/2017 | Khalid et al. | |
| 2017/0339341 A1 | 11/2017 | Zhou et al. | |
| 2018/0063514 A1 | 3/2018 | Mizuno | |
| 2018/0098131 A1 | 4/2018 | Zhou | |
| 2018/0131907 A1 | 5/2018 | Schmirler et al. | |
| 2018/0146216 A1 | 5/2018 | Chang et al. | |
| 2018/0164593 A1 | 6/2018 | Van der Auwera et al. | |
| 2018/0173957 A1 | 6/2018 | Pavetic et al. | |
| 2018/0213202 A1 | 7/2018 | Kopeinigg et al. | |
| 2018/0220048 A1 | 8/2018 | Tamir et al. | |
| 2018/0253884 A1 | 9/2018 | Burnett, III et al. | |
| 2018/0255332 A1 | 9/2018 | Heusser | |
| 2018/0302602 A1 | 10/2018 | Chen et al. | |
| 2018/0332218 A1 | 11/2018 | Yoshimura | |
| 2018/0342043 A1 | 11/2018 | Vandrotti et al. | |
| 2018/0342106 A1 | 11/2018 | Rosado | |
| 2018/0343387 A1 | 11/2018 | Bostick et al. | |
| 2018/0350146 A1 | 12/2018 | Gervasio et al. | |
| 2018/0359489 A1 | 12/2018 | Lakshman et al. | |
| 2018/0376217 A1 | 12/2018 | Kahng et al. | |
| 2019/0012844 A1 | 1/2019 | Rao et al. | |
| 2019/0051037 A1 | 2/2019 | Chui et al. | |

(56) References Cited

U.S. PATENT DOCUMENTS

| | | | |
|---|---|---|---|
| 2019/0094981 A1* | 3/2019 | Bradski | G02B 27/0093 |
| 2020/0210766 A1* | 7/2020 | Lim | G06K 9/6256 |

FOREIGN PATENT DOCUMENTS

| | | | |
|---|---|---|---|
| WO | 2016029224 A1 | 2/2016 | |
| WO | 2017186649 A1 | 11/2017 | |
| WO | 2017201751 A1 | 11/2017 | |
| WO | 2017205642 A1 | 11/2017 | |
| WO | 2018036456 A1 | 3/2018 | |
| WO | 2018039646 A1 | 3/2018 | |
| WO | 2018055340 A1 | 3/2018 | |
| WO | 201810338 A1 | 6/2018 | |
| WO | 2018144315 A1 | 8/2018 | |
| WO | 2018175855 A1 | 9/2018 | |

OTHER PUBLICATIONS

Ballan, Luca, et al. "Unstructured video-based rendering: Interactive exploration of casually captured videos." ACM Transactions on Graphics (TOG). vol. 29. No. 4. ACM, 2010. ftp://ftp.idc.ac.il/Faculty/arik/Seminar2010/papers/VideoDepictions/videoExploration.pdf.

Narayanan, P. J., Peter W. Rander, and Takeo Kanade. "Constructing virtual worlds using dense stereo." IEEE, 1998. https://www.researchgate.net/profile/Peter_Rander/publication/3766361_Constructing_virtual_worlds_using_dense_stereo/links/55fa9fb808ae07629e0417dc/Constructing-virtual-worlds-using-dense-stereo.pdf.

Possegger, Horst, et al., "Robust real-time tracking of multiple objects by volumetric mass densities," Proceedings of the IEEE Conference on Computer Vision and Pattern Recognition. 2013. http://citeseerx.ist.psu.edu/viewdock/download?doi=10.1.1.648.3459&rep=rep1&type=pdf.

Rematas, Konstantinos, et al., "Soccer on Your Tabletop," Proceedings of the IEEE Conference on Computer Vision and Pattern Recognition. 2018. http://grail.cs.washington.edu/projects/soccer/.

Landabaso, José Luis, and Montse Pardás, "Foreground regions extraction and characterization towards real-time object tracking," International Workshop on Machine Learning for Multimodal Interaction. Springer, Berlin, Heidelberg, 2005. http://landabaso.org/publications/mlmi-05-landabaso.pdf.

Shih, Huang-Chia, "A Survey of Content-Aware Video Analysis for Sports," IEEE Transactions on Circuits and Systems for Video Technology 28.5 (2018): 1212-1231. https://ieeexplore.ieee.org/stamp/stamp.jsp?arnumber=7827117.

"Nokia, AT&T and Jaunt Showcase 5G and Immersive Experiences," Telecom Review, telecomreviewna.com, Nov. 29, 2018. https://web.archive.org/web/20190203205836/http://www.telecomreviewna.com/index.php?option=com_content&view=article&id=2485:nokia-atat-and-jaunt-showcase-5g-and-immersive-experiences&catid=3: newsflash&Itemid=131.

"Immersive sports analysis," Viz Libero, vizrt.com, Feb. 3, 2019. https://web.archive.org/web/20190203205957/https://www.vizrt.com/products/viz-libero/.

Gupta, Abhinav, et al. "Estimating spatial layout of rooms using volumetric reasoning about objects and surfaces." Advances in neural information processing systems, 2010. http://papers.nips.cc/paper/4120-estimating-spatial-layout-of-rooms-using-volumetric-reasoning-about-objects-and-surfaces.pdf.

Jia, Yun-Tao, Shi-Min Hu, and Ralph R. Martin. "Video completion using tracking and fragment merging." The Visual Computer 21.8-10 (2005): 601-610. http://citeseerx.ist.psu.edu/viewdoc/download?doi=10.1.1.166.30&rep=rep1&type=pdf.

Cai, Haoye, et al. "Deep video generation, prediction and completion of human action sequences." Proceedings of the European Conference on Computer Vision (ECCV). 2018. http://openaccess.thecvf.com/content_ECCV_2018/papers/Chunyan_Bai_Deep_Video_Generation_ECCV_2018_paper.pdf.

Patwardhan, Kedar A., Guillermo Sapiro, and Marcelo Bertalmio. "Video inpainting of occluding and occluded objects." IEEE International Conference on Image Processing 2005. vol. 2. IEEE, 2005. https://www.researchgate.net/profile/Kedar_Palwardhan2/publication/6534338_Video_Inpainting_Under_Constrained_Camera_Motion/links/0c96051e0323d67580000000/Video-Inpainting-Under-Constrained-Camera-Motion.pdf.

Zhang, Yunjun, Jiangjian Xiao, and Mubarak Shaft "Motion layer based object removal in videos." 2005 Seventh IEEE Workshops on Applications of Computer Vision (WACV/MOTION'05)—vol. 1. vol. 1. IEEE, 2005. http://citeseerx.ist.psu.edu/viewdoc/download?doi=10.1.1.75.7244&rep=rep1&type=pdf.

Kang, Kai, et al. "Object detection from video tubelets with convolutional neural networks." Proceedings of the IEEE conference on computer vision and pattern recognition. 2016. http://openaccess.thecvf.com/content_cvpr_2016/papers/Kang_Object_Detection_From_CVPR_2016_paper.pdf.

* cited by examiner

VALIDATING OBJECTS IN VOLUMETRIC VIDEO PRESENTATIONS

The present disclosure relates generally to video technology, and relates more particularly to systems, non-transitory computer-readable media, and methods for validating objects appearing in volumetric video presentations.

BACKGROUND

Volumetric video uses a plurality of cameras to capture a 360 degree field of view of a scene. Unlike traditional 360 degree video that is used for applications like virtual reality, gaming, and the like, however, volumetric video is captured from the outside, in. When viewing a volumetric video scene, a viewer may view the scene from any angle (including the middle of the scene), may zoom in or out of the scene, or may view the scene from different perspectives within the scene. The scene may also be viewed in two or three dimensions (e.g., using traditional two-dimensional television displays, three dimensional television displays, head mounted displays, and the like). As such, volumetric video techniques may be used to enhance the viewing experience.

SUMMARY

The present disclosure describes a device, computer-readable medium, and method for validating objects appearing in volumetric video presentations. In one example, a method includes obtaining a volumetric video presentation depicting a scene, wherein the volumetric video presentation is associated with a metadata file containing identifying information for the scene, identifying user-generated content that depicts the scene, by matching metadata associated with the user-generated content to the metadata file associated with the volumetric video presentation, comparing a first object appearing in the volumetric video presentation to a corresponding second object appearing in the user-generated content, assigning a score to the first object based on the comparing, wherein the score indicates a probability that the first object has not been manipulated, and altering the volumetric video presentation to filter the first object from the volumetric video presentation when the score falls below a threshold.

In another example, a non-transitory computer-readable storage medium stores instructions which, when executed by a processor, cause the processor to perform operations. The operations include obtaining a volumetric video presentation depicting a scene, wherein the volumetric video presentation is associated with a metadata file containing identifying information for the scene, identifying user-generated content that depicts the scene, by matching metadata associated with the user-generated content to the metadata file associated with the volumetric video presentation, comparing a first object appearing in the volumetric video presentation to a corresponding second object appearing in the user-generated content, assigning a score to the first object based on the comparing, wherein the score indicates a probability that the first object has not been manipulated, and altering the volumetric video presentation to filter the first object from the volumetric video presentation when the score falls below a threshold.

In another example, a system includes a processor deployed in a telecommunication service provider network and a non-transitory computer-readable storage medium stores instructions which, when executed by the processor, cause the processor to perform operations. The operations include obtaining a volumetric video presentation depicting a scene, wherein the volumetric video presentation is associated with a metadata file containing identifying information for the scene, identifying user-generated content that depicts the scene, by matching metadata associated with the user-generated content to the metadata file associated with the volumetric video presentation, comparing a first object appearing in the volumetric video presentation to a corresponding second object appearing in the user-generated content, assigning a score to the first object based on the comparing, wherein the score indicates a probability that the first object has not been manipulated, and altering the volumetric video presentation to filter the first object from the volumetric video presentation when the score falls below a threshold.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
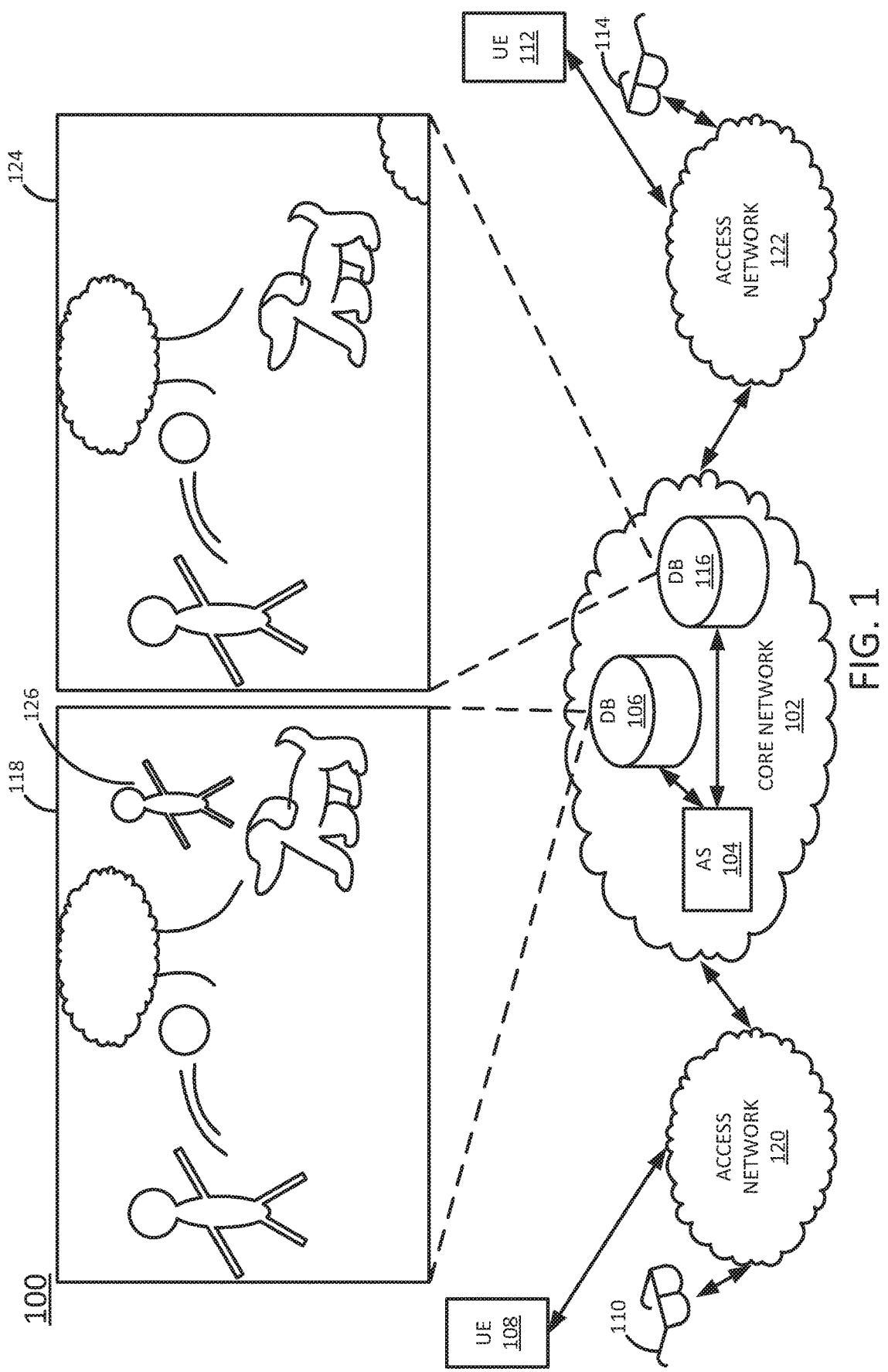
FIG. 1 illustrates an example system in which examples of the present disclosure for validating objects appearing in volumetric video presentations may operate.

In one example, the present disclosure provides systems, non-transitory computer-readable media, and methods for validating objects appearing in volumetric video presentations. As discussed above, volumetric video techniques may be used to enhance the viewing experience of visual media and events, such as movies, television shows, video games, extended reality applications (e.g., training exercises), and sporting events, by making the experience more immersive. However, the nature of the volumetric video creation process may also make volumetric video presentations susceptible to the insertion and/or manipulation of objects (e.g., in the visual portions of the volumetric video presentations). For instance, an object that did not appear in any of the original video streams used to render the volumetric video presentation could be digitally added into the volumetric video presentation. Alternatively, an object that did appear in the original video streams used to render the volumetric video presentation could be digitally altered to change its appearance in the volumetric video presentation. Such manipulations of the volumetric video presentation may be harmless (e.g., the result of poor video editing techniques), or may be driven by malicious intent (e.g., to perpetuate a false narrative or news story). In an era where information can be easily created and distributed to large audiences in very little time, there is a heightened need to combat the propagation of information that has been willfully manipulated.

Volumetric video is particularly unique with respect to traditional two-dimensional video in the sense that volumetric video allows objects to be placed behind other objects in a three-dimensional space, or allows objects to be obscured by certain viewpoints in the three-dimensional space. Additionally, volumetric video may exhibit different visual changes with respect to lighting that are not as easily aligned to two-dimensional assets. Thus, a viewer of the volumetric video presentation may be unable to easily identify when objects appearing in a volumetric video presentation have been manipulated.

Examples of the present disclosure automatically validate objects appearing in volumetric video presentations. In one example, an object appearing in a volumetric video presentation may be analyzed and assigned a score that indicates a probability that the object has been inserted or manipulated. The scoring may employ an external pool of data, such as a pool of user-generated content (e.g., not including the original video streams from which the volumetric video presentation was rendered), to validate the object. For instance, videos uploaded by users of a social media site may be used to evaluate the authenticity of objects appearing in a volumetric video presentation. The user-generated content may comprise volumetric videos and/or traditional two-dimensional videos. The evaluation may compare a first object in a user-generated video to a corresponding second object in the volumetric video presentation and assign a score based on how similar the attributes (e.g., position, color, time, appearance, audio, lighting, etc.) of the first and second objects are. This validation process may be performed on a voxel-by-voxel basis for the volumetric video presentation.

It should be noted that the above-described validation process is bi-directional. That is, user-generated content may be used to validate objects appearing in a volumetric video presentation, as described. But similarly, a volumetric video presentation could also be used to validate objects appearing in user-generated content. The true source of an object that appears in both the volumetric video content and in the user-generated content may be determined through an aggregation of objects across sources. For example, the object having the characteristics that are most frequently found among all aggregations may be declared the "source" object. In another example, an operator may determine that objects coming from certain sources (e.g., sources that have been validated in the past) may carry more weight than objects coming from other or unknown sources, and a weighting scheme may be employed to determine the "source" object. In another example, the visual coherence of an object may be measured to determine which object is most likely to be authentic. The visual coherence may be determined, for example, through pixel value adjacency or smoothness after frequency-domain analysis, anti-aliasing of pixel values detected at seams in an object versus the scene, or a Bayer filter demosaicing driven analysis in which characteristics of the capture device (e.g., camera) can be computationally verified for consistency among object and scene.

In further examples, once objects appearing in a volumetric video presentation have been analyzed and scored to assess authenticity, a viewer may choose to filter out objects whose scores fall below a threshold (which may be viewer defined). For instance, video editing and/or rendering techniques may be used to remove low-scoring objects from the volumetric video presentation. As such, propagation of manipulated content can be reduced.

Further examples of the present disclosure may apply the same concept to validate audio portions of a volumetric video presentation. For instance, the audio portion of a user-generated video may be aligned with the audio portion of the volumetric video presentation to detect anomalies or differences. This audio alignment may include temporal stretching and/or compression of the audio portions.

The physical environment or space that is depicted in a volumetric video may be represented in the volumetric video as a plurality of "voxels" having positional coordinates (e.g., X, Y, Z with respect to a reference point), color information (e.g., red, green, blue values and/or cyan, magenta, yellow values), transparency information (e.g., zero to 100 percent), shading information, texture information, and so forth. In one example, the set of information values for respective voxels may change from one frame of the volumetric video to the next, e.g., as objects move through the physical environment(s), as lighting or other environmental conditions change, and so forth.

To further aid in understanding the present disclosure, FIG. 1 illustrates an example system 100 in which examples of the present disclosure for validating objects appearing in volumetric video presentations may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 3:
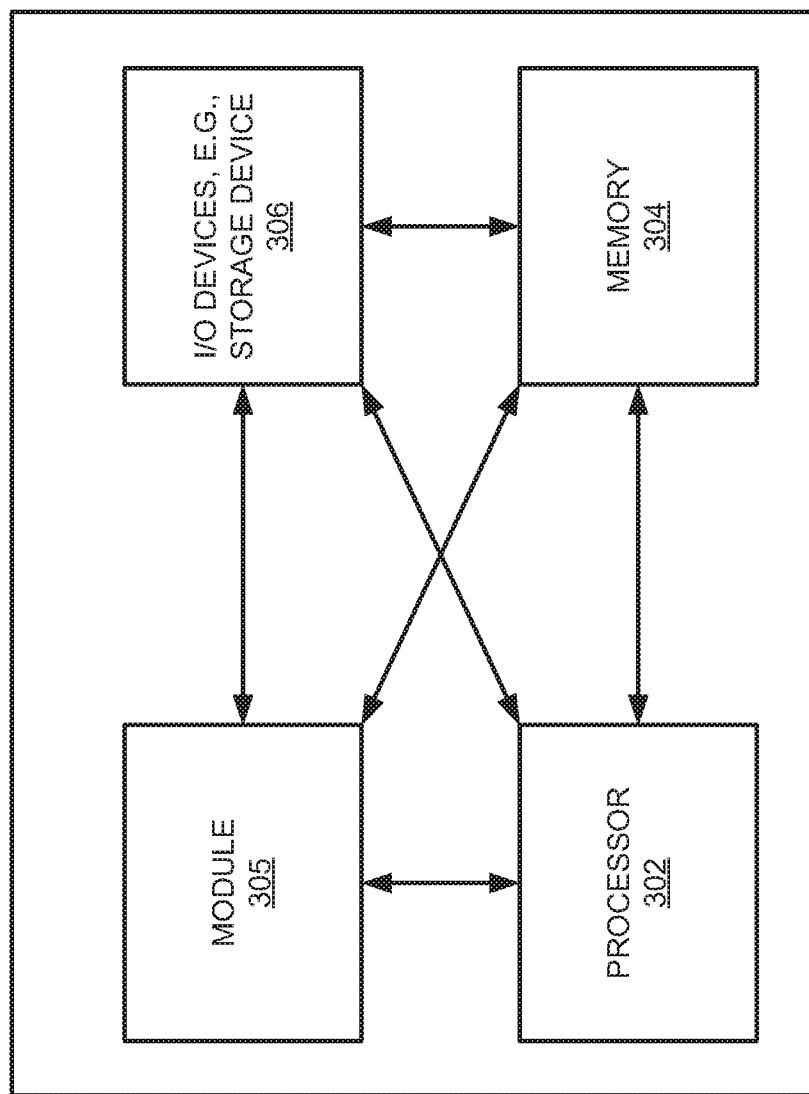
FIG. 3 depicts a high-level block diagram of a computing device specifically programmed to perform the functions described herein.

In accordance with the present disclosure, application server (AS) 104 may comprise a computing system or server, such as computing system 300 depicted in FIG. 3, and may be configured to provide one or more operations or functions for validating objects appearing in volumetric video presentations, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

The AS 104 may be communicatively coupled to a first database (DB) 106. The first DB 106 may store volumetric video presentations and/or individual video streams from which volumetric video presentation have been rendered, such as volumetric video presentation 118 of a scene. For instance, the first DB 106 may comprise a library of volumetric videos, volumetric video traversals (e.g., continuous sequences of viewpoints through the volumetric videos), a 2D video library, an image library, a plurality of 2D object detection/recognition models (e.g., machine learning-based image detection models), a catalogue matching 2D objects to 3D object models, and so forth that may be processed by AS 104 in connection with validating objects appearing in volumetric video presentations.

The first DB 106 may further store additional information such as a lexicon of topic models, e.g., machine learning-based models to identify topics and/or themes in 2D and/or volumetric video, and so forth. As referred to herein, a machine learning model (MLM) (or machine learning-based model) may comprise a machine learning algorithm (MLA) that has been "trained" or configured in accordance with input data (e.g., training data) to perform a particular service, e.g., to predict viewpoints that are likely to be of interest to viewers of volumetric video presentations. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

The AS 104 may also be communicatively coupled to a second database (DB) 116. The second DB 116 may store user-generated content (e.g., images, video, and the like which are generated and shared by network end-users, via social media or other means), such as a user-generated video 124 of a scene. For instance, the second DB 116 may comprise a repository of videos uploaded by users of a video sharing site.

In a further example, AS 104 may comprise a physical storage device (e.g., a database server), to store various types of information in support of systems for validating objects appearing in volumetric video presentations, in accordance with the present disclosure. For example, AS 104 may store any or all of the information stored by the first DB 106 and/or the second DB 116. In a further example still, the AS 104 may acquire video streams directly from cameras that are filming a scene, rather than from the first DB 106. For instance, the cameras may stream video of a live event (e.g., a sporting event, a concert, or the like) directly to the AS 104, where volumetric video traversals of the live event may be rendered in real time (e.g., as the video streams are received by a processing system that is capable of performing the rendering, subject to any network latency).

Although a single application server (AS) 104 and two databases (DBs) 106 and 116 are illustrated in FIG. 1, it should be noted that any number of servers and databases may be deployed. For instance, a plurality of servers and databases may operate in a distributed and/or coordinated manner as a processing system to perform operations for validating objects appearing in volumetric video presentations, in accordance with the present disclosure. For ease of illustration, various additional elements of network 102 are omitted from FIG. 1.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in further communication with a plurality of user endpoint devices (UEs), such as devices 108 and 110. Similarly, access network 122 may be in further communication with a plurality of user endpoint devices (UEs), such as devices 112 and 114. In one example, UEs 108-114 may each comprise a mobile device, a cellular smart phone, a wearable computing device (e.g., smart glasses, augmented reality glasses, head mounted displays, or headsets), a digital camera, a web-camera, a home-based or business-based security camera, a remote controlled and/or automated drone (with one or more cameras), a personal computer (e.g., a laptop, a tablet computer, a desktop computer, etc.), a bank or cluster of such devices, and the like. In a further example, at least some of the UEs 108-114 include or are communicatively coupled to a display that is capable of displaying volumetric video. For instance, UEs 110 and 114 specifically comprise head mounted displays of the type that may be used to view volumetric video presentations. In one example, UEs 108-114 may each comprise programs, logic or instructions for performing functions in connection with examples of the present disclosure for validating objects appearing in volumetric video presentations. For example, devices 108-114 may each comprise a computing system or device, such as computing system 300 depicted in FIG. 3, and may be configured to provide one or more operations or functions in connection with examples of the present disclosure for validating objects appearing in volumetric video presentations, as described herein.

In one example, the AS 104 may identify objects appearing in volumetric video presentations. The AS 104 may also identify user-generated content that depicts scenes depicted in the volumetric video presentation. Once the correspondence between the volumetric video presentation and the user-generated content is established, the AS 104 may analyze objects appearing in the volumetric video presentation and/or the user-generated content, in order to assess the validity or authenticity of those objects (e.g., to confirm that the objects have not been inserted, manipulated, or otherwise tampered with). For instance, the AS 104 may detect that an object appearing in a volumetric video presentation of a scene, such as the person 126 appearing in the volumetric video presentation 118, is not present in a user-generated video of the same scene, such as user-generated video 124.

The AS 104 may alert a creator or publisher of the volumetric video presentation when objects whose validity cannot be confirmed (e.g., whose probability of being valid falls below a threshold) are detected. The AS 104 may also filter objects whose validity cannot be confirmed from the volumetric video presentation, so that these objects are not presented to viewers.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth within a scene depicted by the volumetric video presentation. Thus, these and other modifications are all contemplated within the scope of the present disclosure.

Figure 2:
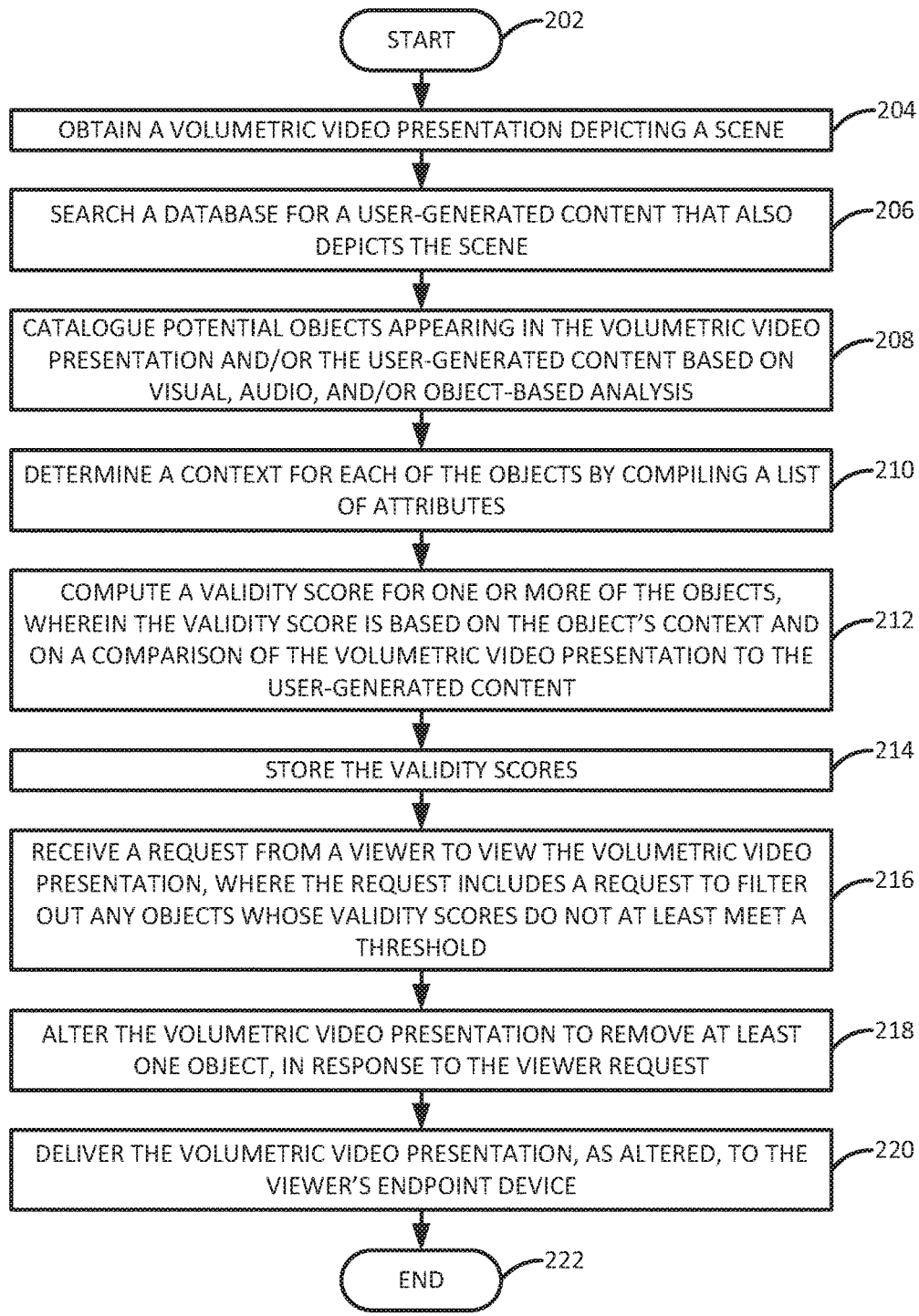
FIG. 2 illustrates a flowchart of an example method for validating objects appearing in volumetric video presentations.

FIG. 2 illustrates a flowchart of an example method 200 for validating objects appearing in volumetric video presentations. In one example, the method 200 may be used to assess the validity or authenticity of objects appearing in a volumetric video presentation (e.g., to validate that the objects were not inserted or manipulated after rendering of the volumetric video presentation). The steps, functions, or operations of the method 200 may be performed, for example, by the AS 104 and/or one of the UEs 108-114 illustrated in FIG. 1. For instance, if a UE has a sufficiently powerful processor, the UE may perform all steps of the method 200. Alternatively, to conserve processing power, the UE may offload some of the more processing intensive steps of the method 200 to a remote application server.

In another example, the steps, functions, or operations of method 200 may be performed by a computing device or system 300, and/or processor 302 as described in connection with FIG. 3 below. Similarly, in one example, the steps, functions, and/or operations of the method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processor, such as processor 302.

The method 200 begins in step 202. In step 204, the processor may obtain a volumetric video presentation. The volumetric video presentation may, in one example, comprise a plurality of traversals rendered from a plurality of video streams depicting a scene. In one example, the volumetric video presentation is retrieved from a database, such as a library of volumetric videos and volumetric video traversals. The volumetric video presentation may be retrieved in response to a request from a user (e.g., a viewer of the volumetric video presentation, a creator or publisher of the volumetric video presentation, etc.) to view the volumetric video presentation and/or to validate objects appearing in the volumetric video presentation. In one example, a metadata file may be associated with the volumetric video presentation and may contain information such as the location (e.g., geographic coordinates, name of venue, etc.), date, and/or time depicted in the volumetric video presentation. For instance, if the volumetric video presentation depicts the New Year's Eve ball drop in Times Square of New York City, the metadata might indicate that the location depicted in the volumetric video presentation is Times Square, or a specific intersection (e.g., $42^{nd}$ Street and Broadway) in New York City. The metadata might also indicate that the date and time depicted in the volumetric video presentation is 11:59 PM on Dec. 31, 2018—12:01 AM on Jan. 1, 2019 and the like.

In step 206, the processor may search for user-generated content that depicts the scene depicted in the volumetric video presentation. In one example, the user-generated content may be stored in a database, such as a repository of videos uploaded by users of a video sharing site. The individual items of user-generated content that are stored in the database may each be associated with a respective metadata file containing information such as the location (e.g., geographic coordinates, name of venue, etc.), date, and/or time depicted in the user-generated content. Thus, the processor may search the database by searching for metadata or content tags that match attributes of the volumetric video presentation. For instance, continuing the Times Square New Year's Eve ball drop example above, the processor may search the database for metadata indicating that corresponding user-generated content depicts Times Square or $42^{nd}$ Street in New York City, during a window of time that encompasses 11:59 PM on Dec. 31, 2018-12:01 AM on Jan. 1, 2019. In a further example, the processor may use location and date/time metadata to bootstrap an initial search of the database. However, some of the search criteria may be relaxed depending on the purpose of the search. For example, time criteria may be relaxed if the search requires, for example, images of historical or relatively persistent objects (e.g., buildings, backgrounds, monuments, etc.). In further examples, objects that have already been identified for validation in the volumetric video presentation can be used to drive an image-based search of the user-generated content (e.g., to look for objects occurring in the user-generate content that match the object to be validated, regardless of when the user-generated content was captured). In other examples, user-generated content may be matched to the volumetric video presentation through a visual analysis of the contents, rather than (or in addition to) by matching metadata.

In step 208, the processor may catalogue or identify potential objects in the volumetric video presentation and/or in the user-generated content for validation. In one example, potential objects may be identified by processing the volumetric video presentation and the user-generated content with a vision tool, an audio tool, or an object-specific recognition tool (e.g., a system or algorithm for recognizing faces, objects, characters, or the like). For instance, a vision tool may be used to identify an object that appears in both the volumetric video presentation and in an item of user-generated content. In one example, each object that is identified in this way may be catalogued with a relative time and/or location indicating where and when the object is depicted in the volumetric video presentation and in the user-generated content. For instance, if the TKTS discount booth in Times Square is identified in the volumetric video presentation as a potential object for validation, a catalogue entry for the TKTS discount booth may indicate that the TKTS discount booth appears in the background of the image from the five-second mark through the twenty-second mark of the volumetric video presentation (or from frame Fi through frame Fn). Similarly, the catalogue entry may indicate that the TKTS discount booth appears in the foreground of the item of user-generated content at the five minute, thirty second-mark through the five minute, forty-five second-mark (or from frame Fj-Fx). Similar techniques could also be used to detect when an object appears in one of the volumetric video presentation and the user-generated content, but not the other. This information allows the frames of the volumetric video presentation to be aligned with the frames of the user-generated content, e.g., so that the volumetric video presentation and the user-generated content are synchronized to show the same scene (or nearly the same scene) during the same window of time, which allows for better comparison of objects.

In some examples, an audio tool may help to align the volumetric video presentation with the item of user-generated content, which in turn may help to establish correspondence between visual events and objects occurring in the volumetric video presentation and in the item of user-generated content. For instance, both the volumetric video presentation and the item of user-generated content may capture audio of the ten-second countdown to New Year's Day. The respective audio tracks could then be matched up to synchronize the corresponding video. This may therefore help to identify objects that are common to the volumetric video presentation and the item of user-generated content. An object-specific recognition tool may also be used to align and validate individual objects (e.g., specific vehicles or celebrities appearing in the volumetric video presentation and the item of user-generated content).

In step 210, the processor may determine a context for each object identified in step 208. In one example, the processor may determine an object's context by observing the object, both in the volumetric video presentation and in one or more items of user-generated content, and compiling a profile of attributes for the object based on the observation. For instance, in addition to the metadata that may already be associated with the object (e.g., via the metadata files associated with the volumetric video presentation and the user-generated content), the processor may also determine one or more of the following attributes for the object: speed (within the volumetric video presentation and the user-generated content, if the object is moving), model information for parts (e.g., if the object is a vehicle, whether the vehicle is a Honda Accord® or a Honda Civic®), typical scene context (e.g., football game, concert, etc.), color, lighting, and scale. In a further example, color, lighting, and/or scale comparisons for context may also be applied to spatial neighbors of the object. In further examples still, context may be determined through analysis of environmental effects (e.g., wind, precipitation, etc.) and sentiment (e.g., whether faces of people in the object's vicinity appear happy, sad, excited, angry, etc.). Thus, a perceived emotion could also be associated with the object context. In another example, audio events may be detected spatially in the audio track. As discussed in further detail below, inconsistencies between audio events and/or corresponding visual events may lower an object's validity score (e.g., a crowd does not appear to visually react to an audio event such as a very loud or piercing sound, or a crowd does not appear to visually react to a visual event such as a large object or a ball moving from one part of an arena to another part of an arena, and so on).

In step 212, the processor may compute a validity score for one or more of the objects identified in step 208, based on the object context determined in step 210 and on a comparison between the volumetric video presentation and one or more items of user-generated content. The validity score indicates a likelihood or probability that the object is authentic, e.g., has not been manipulated (e.g., inserted into, altered or deleted from the original video stream). In one example, the score may comprise a percent match (e.g., having a value between 0.0 and 1.0, or zero percent and one hundred percent) between an object as the object appears in the volumetric video presentation and the object as the object appears in one or more items of user-generated content. In this case, the higher the score or percent match, the higher the probability that the object appearing in the volumetric video is valid (e.g., not manipulated). Conversely, the lower the score or percent match, the lower the probability that the object appearing in the volumetric video is valid.

Validity scores can be computed both for objects considered individually (e.g., only using the object in question) and objects considered as part of a whole (e.g., when evaluating consistency among a set of purportedly same objects). In both cases, existing techniques may be utilized to assign a validity or authenticity score via visual analysis of the object and the object's properties. Some visual analysis techniques that may be used include pixel value adjacency or smoothness after a frequency-domain analysis, anti-aliasing of pixel values detected at seams in an object versus the scene, or a Bayer filter demosaicing driven analysis in which characteristics of the capture device (e.g., camera) can be computationally verified for consistency among object and scene. Some audio analysis techniques that may be used include speaker-level consistency from format, frequency, cadence, and prosody analysis, general harmonic analysis for consistency in an object's sound, phase shift tamper detection, and background noise scanning (which alters subtle background sounds), and audio-visual consistency for synchronization between modalities.

In another example, the score may be a binary score. For instance, a score of zero may indicate that the object is likely invalid, while a score of one may indicate that the object is likely valid. A threshold percent match could be predefined so that any objects whose percent match falls below the threshold are assigned a score of zero, while any objects whose percent match falls above the threshold are assigned a score of one. In one example, crowd sourcing may be used to enhance the scoring process, e.g., an object appearing in a large number of user-generated content (e.g., appearing in over 90% of the correlated scenes), will receive a higher score, whereas an object appearing only in limited instances (e.g., appearing in less than 10% of the correlated scenes) of the user-generated content will receive a lower score.

In another example, the validity score may indicate the nature of any match (or mismatch). For instance, an object appearing in the volumetric video presentation and a corresponding object appearing in an item of user-generated content may appear to be located in the same location (e.g., a billboard appearing over a street). However, the physical appearance of the object in the volumetric video may be different than the physical appearance of the object in the user-generated content (e.g., a different image on the billboard). In this case, separate scores could be generated for the location and appearance of the object, where the location-based validity score may be higher than the appearance-based validity score.

As an example, a plurality of user-generated videos of a scene could be analyzed to identify a set of objects that appears consistently across the plurality of user-generated videos. A volumetric video presentation of the scene could subsequently be analyzed to determine whether any objects in the set of objects are missing or vary in appearance. A combination of inconsistent scenes and objects could also be detected by measuring co-occurrence in a plurality of user-generated videos. In this case, if an object or event appearing in the volumetric video presentation does not occur in a majority of the plurality of user-generated videos, then another search of the user-generated content could be performed specifically to attempt to locate the missing object or event.

In further examples, a globally unique (e.g., time plus space plus object) hash could be created for an object for reference when analyzing future volumetric video presentations.

In step 214, the processor may store the validity scores computed in step 212. For instance, the object catalogue created in step 208 may be updated to include the validity scores for the catalogued objects. In another example, object identifiers and validity scores may be stored with the volumetric video presentation (e.g., as metadata, annotations, or the like).

In step 216, the processor may receive a request from a viewer to view the volumetric video presentation. The request may include a request to filter any objects from the volumetric video presentation whose validity scores do not at least meet some threshold (where the threshold may be viewer defined). For instance, where the validity scores comprise a percent match, the viewer may request that objects whose validity scores fall below 0.8 or eighty percent be removed or filtered from the volumetric video presentation. Where the validity score comprises a binary score, the viewer may request that objects assigned a score of zero be removed or filtered from the volumetric video presentation. In another example, the viewer may specify different thresholds for different types of validity scores. For instance, the viewer may request that objects with location-based validity scores below 0.5 and/or appearance scores below 0.7 be filtered out. For instance, referring back to the billboard example above, if the billboard is located in the same location in both the volumetric video presentation and in the user-generated content, but the images on the billboard are different, this might simply indicate that the billboard is a digital billboard or has been changed recently (and not necessarily that the volumetric video presentation has been manipulated).

In another example, filtering may not remove objects from the volumetric video presentation, but may instead provide some sort of indication to alert the viewer to the fact that certain objects' validity scores do not meet the threshold. For instance, the processor may generate an overlay, where the overlay provides a visual indicator to indicate an object whose validity score fails to meet the threshold. The visual indicator could be an outline around the object, a color highlight on the object, text or icons displayed over or in proximity to the object, a variation on the transparency of the object, or the like.

In step 218, the processor may alter the volumetric video presentation to remove at least one object from the volumetric video presentation, in response to the viewer request. For example, one or more film editing techniques may be used to digitally erase or cover the at least one object.

In step 220, the processor may deliver the volumetric video presentation, as altered in step 218, to the viewer's endpoint device for viewing. In one example, steps 218-220 may occur substantially simultaneously. For instance, if the volumetric video presentation is streamed in chunks to the viewer's endpoint device, the processor may deliver a first chunk to the viewer's endpoint device while simultaneously altering the frames of a second, subsequent chunk to be delivered to the viewer's endpoint device later.

The method 200 may end in step 222. The method 200 may be repeated any number of times as the viewer views the volumetric video. For instance, as the viewer views the volumetric video, he or she may dynamically adjust the thresholds for filtering objects. The processor may react in real time to the adjusted thresholds.

Thus, the method 200 automatically validates objects appearing in volumetric video presentations, using a pool of user-generated content. For instance, videos uploaded by users of a social media site may be used to evaluate the authenticity of objects appearing in a volumetric video presentation. The user-generated content may comprise volumetric videos and/or traditional two-dimensional videos. As such examples of the disclosure may make use of large amounts of freely available content. The evaluation may compare a first object in a user-generated video to a corresponding second object in the volumetric video presentation and assign a score based on how similar the attributes (e.g., position, color, time, appearance, audio, lighting, etc.) of the first and second objects are. Once objects appearing in a volumetric video presentation have been analyzed and scored to assess authenticity, a viewer may choose to filter out objects whose scores fall below a threshold (which may be viewer defined). For instance, video editing and/or rendering techniques may be used to remove low-scoring objects from the volumetric video presentation. As such, propagation of manipulated content can be reduced.

In further examples, the present disclosure may assist volumetric video creators at the time of creation or rendering of a volumetric video presentation. For instance, objects may be analyzed for authenticity in the original video streams, prior to the rendering of a volumetric video traversal. Such an approach may also assist volumetric video creators in better aligning volumetric video traversals with viewer expectations (e.g., regarding realistic placement and/or use of objects).

In further examples, the present disclosure may be used to detect trends in the manipulation of video objects (e.g., objects that are increasingly being manipulated in volumetric video presentations and/or user-generated content). For instance, commonalities may be detected among low-scoring objects across multiple volumetric video presentations and/or items of user-generated content. Detecting such trends early may limit the propagation of manipulated content. It will also provide insights as to what types of objects are being manipulated.

In further examples still, examples of the present disclosure may be used to remove occlusions from a volumetric video presentation. For instance, based on an analysis as performed by the method 200, it may be determined that an object appearing in the volumetric video presentation is valid, but that the view of the object is completely or partially obstructed in the volumetric video presentation. Knowing the attributes of the object from the user-generated content may allow the obstruction to be removed and the object to be realistically recreated, i.e., using the user-generated content to construct the partially occluded object to be properly rendered.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a wearable display device or an application server could be implemented as illustrated in FIG. 3.

As depicted in FIG. 3, the system 300 comprises a hardware processor element 302, a memory 304, a module 305 for validating objects appearing in volumetric video presentations, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for validating objects appearing in volumetric video presentations may include circuitry and/or logic for performing special purpose functions relating to streaming volumetric video content. The input/output devices 306 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, or a user input device (such as a keyboard, a keypad, a mouse, and the like).

Although only one processor element is shown, it should be noted that the dedicated computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for validating objects appearing in volumetric video presentations (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for validating objects appearing in volumetric video presentations (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method comprising:
obtaining, by a processor, a volumetric video presentation depicting a scene, wherein the volumetric video presentation is associated with a metadata file containing identifying information for the scene;
identifying, by the processor, user-generated content that depicts the scene, by matching metadata associated with the user-generated content to the metadata file associated with the volumetric video presentation;
comparing, by the processor, a first object appearing in the volumetric video presentation to a corresponding second object appearing in the user-generated content, wherein the comparing comprises:
identifying a relative time and location at which the first object appears in the volumetric video presentation;
identifying a relative time and location at which the second object appears in the user-generated content; and
aligning frames of the volumetric video presentation with frames of the user-generated content based on the relative time and location at which the first object appears in the volumetric video presentation and the relative time and location at which the second object appears in the user-generated content;
assigning, by the processor, a score to the first object based on the comparing, wherein the score indicates a probability that the first object has not been manipulated; and
altering, by the processor, the volumetric video presentation to filter the first object from the volumetric video presentation when the score falls below a threshold.

2. The method of claim 1, wherein the identifying information comprises a location of the scene.

3. The method of claim 1, wherein the identifying information comprises a date and time of the scene.

4. The method of claim 1, wherein the user-generated content is retrieved from a repository of content uploaded by users of a social media application.

5. The method of claim 1, wherein the aligning further comprises:
aligning, by the processor, frames of the volumetric video presentation with frames of the user-generated content based on synchronization of an audio track of the volumetric video presentation and an audio track of the user-generated content.

6. The method of claim 1, wherein the comparing further comprises:
comparing, by the processor, a context for the first object with a context for the second object.

7. The method of claim 6, wherein the context for the first object comprises a speed with which the first object is traveling in the volumetric video presentation, and the context for the second object comprises a speed with which the second object is traveling in the user-generated content.

8. The method of claim 6, wherein the context for the first object comprises a color of the first object in the volumetric video presentation, and the context for the second object comprises a color of the second object in the user-generated content.

9. The method of claim 6, wherein the context for the first object comprises a lighting of the first object in the volumetric video presentation, and the context for the second object comprises a lighting of the second object in the user-generated content.

10. The method of claim 6, wherein the context for the first object comprises a scale of the first object in the volumetric video presentation, and the context for the second object comprises a scale of the second object in the user-generated content.

11. The method of claim 6, wherein the context for the first object comprises an environmental effect present in the volumetric video presentation, and the context for the second object comprises an environmental effect present in the user-generated content.

12. The method of claim 6, wherein the context for the first object comprises a perceived sentiment of an individual present in the volumetric video presentation, and the context for the second object comprises a perceived sentiment of an individual present in the user-generated content.

13. The method of claim 1, wherein the score comprises a percent match between the first object and the second object.

14. The method of claim 1, wherein the score comprises a binary indicator indicating whether a percent match between the first object and the second object falls above or below a predefined threshold.

15. The method of claim 1, wherein the altering comprises:
digitally removing, by the processor, the first object from the volumetric video presentation.

16. The method of claim 1, wherein the altering comprises:
generating, by the processor, an overlay that provides a visual indicator to indicate that the score for the first object falls below the threshold.

17. The method of claim 1, further comprising:
delivering, by the processor and subsequent to the altering, the volumetric video presentation to a viewer's endpoint device.

18. A non-transitory computer-readable storage medium storing instructions which, when executed by a processor, cause the processor to perform operations, the operations comprising:
obtaining a volumetric video presentation depicting a scene, wherein the volumetric video presentation is associated with a metadata file containing identifying information for the scene;
identifying user-generated content that depicts the scene, by matching metadata associated with the user-generated content to the metadata file associated with the volumetric video presentation;
comparing a first object appearing in the volumetric video presentation to a corresponding second object appearing in the user-generated content, wherein the comparing comprises:
identifying a relative time and location at which the first object appears in the volumetric video presentation;
identifying a relative time and location at which the second object appears in the user-generated content; and
aligning frames of the volumetric video presentation with frames of the user-generated content based on the relative time and location at which the first object appears in the volumetric video presentation and the relative time and location at which the second object appears in the user-generated content;
assigning a score to the first object based on the comparing, wherein the score indicates a probability that the first object has not been manipulated; and altering the volumetric video presentation to filter the first object from the volumetric video presentation when the score falls below a threshold.

19. A system comprising:
a processor deployed in a telecommunication service provider network; and
a non-transitory computer-readable medium storing instructions which, when executed by the processor, cause the processor to perform operations, the operations comprising:
  obtaining a volumetric video presentation depicting a scene, wherein the volumetric video presentation is associated with a metadata file containing identifying information for the scene;
  identifying user-generated content that depicts the scene, by matching metadata associated with the user-generated content to the metadata file associated with the volumetric video presentation;
comparing a first object appearing in the volumetric video presentation to a corresponding second object appearing in the user-generated content, wherein the comparing comprises:
  identifying a relative time and location at which the first object appears in the volumetric video presentation;
  identifying a relative time and location at which the second object appears in the user-generated content; and
  aligning frames of the volumetric video presentation with frames of the user-generated content based on the relative time and location at which the first object appears in the volumetric video presentation and the relative time and location at which the second object appears in the user-generated content;
assigning a score to the first object based on the comparing, wherein the score indicates a probability that the first object has not been manipulated; and
altering the volumetric video presentation to filter the first object from the volumetric video presentation when the score falls below a threshold.

20. The system of claim 19, wherein the aligning further comprises:
aligning frames of the volumetric video presentation with frames of the user-generated content based on synchronization of an audio track of the volumetric video presentation and an audio track of the user-generated content.

* * * * *